United States Patent [19]

Neuhouser

[11] Patent Number: 5,077,628
[45] Date of Patent: Dec. 31, 1991

[54] CIRCUIT BREAKER PROTECTION APPARATUS

[75] Inventor: Donald Neuhouser, Grove City, Ohio

[73] Assignee: Service Machine Co., Huntington, W. Va.

[21] Appl. No.: 418,102

[22] Filed: Oct. 5, 1989

[51] Int. Cl.[5] .............................................. H02H 3/24
[52] U.S. Cl. ...................................... 361/92; 361/59; 361/90; 361/94; 361/102
[58] Field of Search ....................... 361/92, 59, 86, 90, 361/102, 115, 187, 94

[56] References Cited

U.S. PATENT DOCUMENTS

| | | | |
|---|---|---|---|
| 3,243,658 | 3/1966 | Blackburn | 361/97 |
| 4,331,996 | 5/1982 | Matsko et al. | 361/92 |
| 4,414,601 | 11/1983 | Conroy, Jr. | 361/97 |

Primary Examiner—Todd E. DeBoer
Attorney, Agent, or Firm—McCaleb, Lucas & Brugman

[57] ABSTRACT

This invention prevents a circuit breaker from being re-set for a time sufficient to insure safe dissipation of ionized gases. Current monitors and rectifiers generate a reduced voltage direct current output which is fed into an auxiliary rectifier circuit. That direct current output is proportional to current in power conductors controlled by a circuit breaker. A holding circuit has an electrical power source derived from the power conductors and connected to a release coil for the main power contacts in the circuit breaker. A holding relay has a holding coil in the rectifier circuit, and normally closed holding contacts in the holding circuit. A time switch is connected in shunt with the holding coil. When the direct current output reaches a value corresponding to an overcurrent condition in the power conductors, it energizes the holding coil to open the holding contacts and cause the release coil to trip open the main contacts. Concurrently, the time switch activates; after a predetermined time (e.g., 3 minutes) the time switch closes and shorts out the holding coil enabling the holding contacts to close. This re-energizes the release coil enabling the main power contacts to be re-set. A rectifier in the holding circuit holds the holding coil energized while the holding contacts are open.

16 Claims, 1 Drawing Sheet

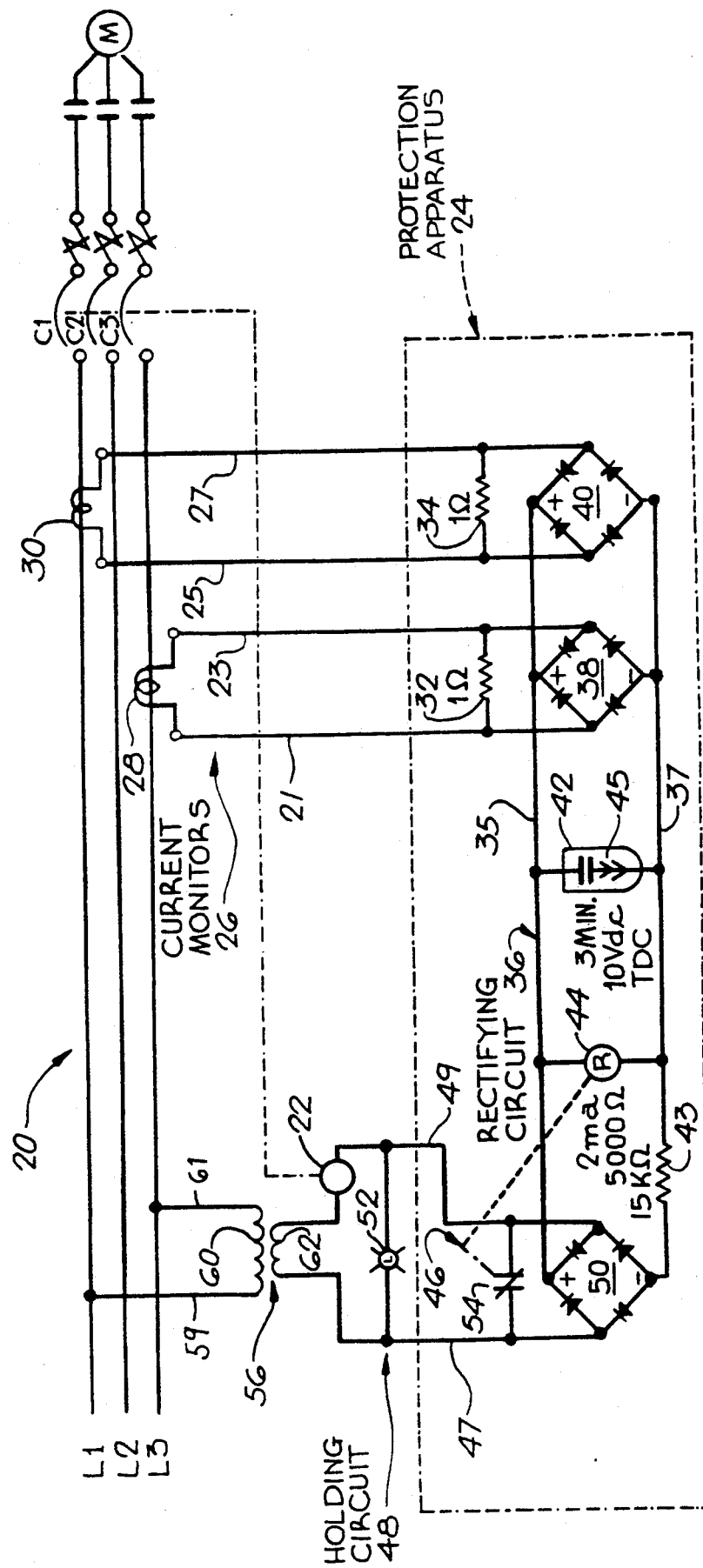

CIRCUIT BREAKER PROTECTION APPARATUS

BACKGROUND OF THE INVENTION

A molded case air circuit breaker is designed and tested to safely interrupt a certain level of fault. However, if the fault is of a significant magnitude, gases in the immediate vicinity of the circuit breaker will be ionized sufficiently to allow an arc to occur inside the circuit breaker, should it be reclosed on the fault before these gases have dissipated. This arcing causes sharp gas pressure increases inside the breaker, and the gases are then forced out all of the circuit breaker's openings. Some of the gas will surround the breaker's terminals and nearby bus bars. An arc between phases (external to the circuit breaker) can result and will persist until something clears the fault. Catastrophic damage often follows. Indeed, a major cause of electrical accidents is the failure of circuit breakers.

If the operator is forced to wait three minutes before reclosing the breaker, this phenomenon and contingent damage can be prevented. (Underwriters Laboratories allows a molded case breaker three minutes between fault tests and the second fault must be cleared.)

In mining applications where trailing cables are used extensively, most circuit breaker tripping is caused by the cable being crushed or partially cut into by mobile equipment. The fault most often involves one or two of the conductors and the ground conductor. Federal law requires that a continuously monitored and fail-save grounding system be provided for mining electrical equipment, where resistor(s) must be used to limit the fault current which may enter the ground system to 25 Amps. Reclosing the breaker eight or even ten times on a fault of this low magnitude will not cause this ionized gas and subsequent arcing problem. An operator cannot always determine the cause of the fault, and knowing the cause does not prevent the operator from unwittingly reclosing the breaker.

A common scenario is seen when this problem occurs: The mining equipment operator is usually working away from the mine power distribution center when a fault occurs and the circuit breaker trips. He then must stop working and investigate the cause of the power being shutoff, and proceeds to the power distribution center. He sees that the breaker has tripped and recloses it. Generally, it has taken longer than three minutes to get to there, so that if a fault is still there the circuit breaker will simply trip again. The operator then may attempt to reclose the breaker, unaware (uneducated re: circuit breakers) that it is best to wait several minutes before reclosing.

Hence, a device is needed which:
  responds only to abnormally high currents if properly applied
  prevents the circuit breaker from being reclosed for a predetermined period of time
  provides (optional) means, during the elapse of this time period, to indicate that the device has operated In a three phase electrical system, a fault which occurs may be one of the following: single line-to-ground fault, line-to-line fault, double line-to-ground fault, or three-phase symmetrical fault. The targets of the circuit breaker protection apparatus of this invention are line-to-line and three-phase symmetrical fault types.

When a line-to-line fault occurs, the current in the third line which is not involved falls to zero. The current in the two affected lines is equal in magnitude, and opposite in direction. When a three phase symmetrical fault occurs, the currents in all three are equal in magnitude, and each is 120 degrees out of phase from the other two. Therefore, at least two phases must be monitored, since the current in the unfaulted phase falls to zero during a line-to-line fault.

A wide variety of circuit breakers is available, however, no known device provides the capability of preventing the circuit from being reclosed for a period of time. The "circuit breaker saver" of the present invention satisfies the requirements very effectively, and also requires only a small enclosure space—an attractive feature where the enclosure is already very crowded with the various control devices comprising the circuit.

BRIEF SUMMARY OF THE INVENTION

A general object this invention is to provide safety apparatus for a circuit breaker which will prevent it from being reset for a sufficient time after tripping to insure dissipation of ionized gases within the power contact chamber of the circuit breaker.

More specifically, the invention is concerned with improved safety apparatus for a heavy duty circuit breaker of the conventional type in which the main power contacts can be closed if an undervoltage release coil ("UVR") is energized, and are made to open (even in the absence of a fault) if the coil is deenergized. Current monitors and rectifiers generate a reduced voltage direct current output in an auxiliary rectifier circuit which includes a time switch and the holding coil of a holding relay. A separate holding circuit includes the release coil and normally closed contacts of the holding relay. The holding circuit has an alternating current power source which in the present case is a transformer connected across two of the power conductors, and has a holding rectifier the input of which is connected to the alternating current power source for the release coil and the output of which is connected to the holding relay coil. When the direct current output into the auxiliary rectifier circuit reaches a value corresponding to an overcurrent condition in the power conductors, the holding coil and the timer switch are simultaneously energized. The holding contacts open, simultaneously deenergizing the release coil to trip the main power contacts, and activating the holding rectifier to apply a holding current to the holding coil. After a predetermined time (e.g., 3 minutes) sufficient for any ionized gases to dissipate, the time switch closes, shorting out the holding coil thereby returning the holding contacts to their normally closed condition, re-energizing the release coil, and enabling the circuit breaker power contacts to be re-set.

BRIEF DESCRIPTION OF THE DRAWING

Other objects and advantages of the invention will be apparent from the following description taken in connection with the drawing which is a schematic circuit diagram illustrating a preferred form of the invention.

DETAILED DESCRIPTION OF THE INVENTION

Referring now to the preferred embodiment shown in the drawings, a multi-phase electrical power system 20 comprises power conductors L1, L2 and L3 connecting a 3-phase electrical power source to a point of use which in the present case is illustrated as a motor M. A conventional heavy duty circuit breaker is partially shown and includes power contacts C1, C2 and C3. A manually operated button or lever (not shown) may be used during normal operation to trip (open) or reset (close) these power contacts. The power contacts are held closed while an undervoltage release coil 22 is energized, and will be tripped open when the coil is deenergized, for instance, in response to an overcurrent condition in one or more of the power conductors indicative of a fault therein.

The safety protection apparatus of the present invention is generally designated 24 and comprises the following circuits and components:

Current monitoring circuit means 26 including: conductors 21,23 and 25,27; a pair of pickup current transformers 28 and 30; and 1-ohm resistors 32 and 34, associated with conductors 21,23 and 25,27, respectively;

an auxiliary, rectifying circuit means 36 including: conductors 35,37, full-wave rectifiers 38 and 40; a timer 42; a 15000-ohm resistor 43; and a 5000-ohm holding coil 44 of a direct current holding relay 46;

a holding circuit means 48 including: conductors 47,49; the release coil 22; a third full-wave rectifier 50; an indicator lamp 52; normally closed holding contacts 54 of holding relay 46; and a transformer coupling 56.

The pickup current transformers 28 and 30 are current-reducing. In this case, each has a "1500/5" rating which means that it induces a reduced alternating current which is 1/300th of the current in the respective power conductor.

The direct current holding relay coil 44 is current-sensitive and requires only two milliamperes through it to open its normally-closed holding contacts 54. In the present example, the coil 44 has a resistance of 5000 ohms, so that the voltage across the holding relay coil 44 is 10 volts DC at its operating point where it opens the contacts 54.

The timer 42 is a special, solid state "on-delay" timer known as a type S timer available from Syrelec Company. It is voltage-sensitive, and maintains a very high resistance so that only minute leakage currents will flow through it at voltages less than its preset voltage which in the present case would be approximately 10 volts direct current. When input voltage across it through conductors 35,37 reaches approximately 10 volts direct current, a preset timing cycle begins. In the present case, it has been determined that a three-minute interval following tripping of the main power contacts is sufficient to insure dissipation of any dangerous level of ionized gases within the circuit breaker case, hence the timer 42 will be pre-set to close its contacts 45 within a predetermined period of three minutes following actuation of the timing cycle by the 10 volt direct current output applied across conductors 35 and 37.

Thus, the timer 42 and holding coil 44 operate at substantially the same time in response to an overcurrent condition in the power conductors which applies approximately 10 volts DC across conductors 35 and 37.

The use of the undervoltage release coil 22 is common in heavy duty applications such as mining, where the circuit breaker is made to remain open if the voltage across the release coil 22 is below a preset level. The release coil is normally energized from the supply side of the circuit breaker which is alternating current in the embodiment illustrated.

In normal operation, the holding contacts 54 are normally closed and rectifier 50 is shunted, allowing normal current to flow through the contacts 54 and release coil 22 to hold the power contacts C1, C2 and C3 closed.

The transformer coupling 56 comprises a primary 60 connected by conductors 59 and 61 to power conductors L1 and L3; and a secondary 62 connected to conductors 47 and 49 in the holding circuit 48. Thus, the power for the release coil 22 and holding rectifier 50 is derived from the main power conductors.

If the pickup transformers 28 and 30 sense an overcurrent caused by a fault, the DC current output directed in to the auxiliary rectifying circuit 36 will cause a current exceeding two milliamperes to flow through the holding coil 44. This opens holding contacts 54. At this time, resistance in the holding circuit 48 will be determined primarily by the 15000 ohm resistor 43 and the 5000-ohm holding coil 44. These resistances combine to reduce the current in the holding circuit to a level low enough to de-energize the release coil 22 to open the main power contact C1, C2 and C3, while maintaining current sufficiently high to keep the holding coil 44 energized and the fault indication lamp 52 lighted.

Rectifier 50 is connected into the rectifying circuit 36 (through resistor 43) in the same polarity as rectifiers 38 and 40 insuring that the rectified current flowing through holding coil 44 from the AC source 56 is always additive to that which is flowing from rectifiers 38 and 40.

The indicating lamp 52 is not essential but most advantageous to the present invention. If present, it illuminates whenever the normally closed holding contacts 54 are open and sufficient current is flowing through the release coil 22 to illuminate the lamp but insufficient to activate the release coil 22. The indicating lamp must be of the low energy type requiring only a few milliamperes sufficient to illuminate the lamp but insufficient to activate the release coil. While the indicating lamp is optional, because the apparatus will operate properly without it, it is of great advantage because it illuminates during the three minute timing period providing a positive indication to the operator that the circuit breaker cannot be reclosed while the lamp is on. In addition, the lighted lamp informs the operator that a fault has occurred somewhere locally and that a power outage is not the result of any upstream circuit breaker being tripped.

In operation and in the absence of any fault condition involving power conductors L1, L2 or L3, the circuit breaker power contact means C1, C2 and C3 may be closed to energize the motor M when the release coil 22 is fully energized through the normally closed holding contacts 54. As long as the release coil 22 remains fully energized, it effectively holds the circuit breaker power contacts closed. During this normal running, currents in L1 and L3 sensed by the stepdown monitors 30 and 28 flow in current-sensing lines 21,23 and 25,27. These are very small currents because of the reducing effect of the stepdown inductive coupling. These small currents are divided between resistors 32 and 34 on the one hand and the holding coil 44 on the other hand, with the current through the holding coil 44 being rectified by rectifiers 38 and 40. Thus, each current transformer 28 and 30 acts as a current source for the DC holding coil 44. Current flowing from both sources 28 and 30 at once is always additive because it is rectified and in the same polarity. When the total current contribution through the DC holding coil 44 from transformer 28, or 30, or both, reaches 2 milliamperes, the timer 42 begins its predetermined timing period of, in this case, three minutes, and the normally closed holding contacts 54 open. This applies a DC holding current through rectifier 50 and resistor 43 sufficient to keep the holding coil 44 energized and contacts 54 open during the three minute period. Lamp 52 is on showing there has been a local fault and informing the operator that the circuit breaker cannot be reset. Current through the release coil 22 is too diminished to hold the power contacts C1, C2 and C3 closed.

At the end of the three minute timing period, the resistance of the timer 42 falls to a very low value allowing current to short through and drop the voltage between conductors 35 and 37 to a value below that required to drive the two milliamperes necessary to activate holding coil 44. The holding coil in effect becomes deenergized enabling its normally closed contacts 54 to close, restoring sufficient normal current flow through release coil 22 to enable it hold the power contacts C1, C2 and C3 closed when the circuit breaker is subsequently reset.

At the same time, the timer 42 resets, and will begin another timing cycle if the required 10 volt direct current is applied between conductors 35 and 37. The circuit breaker may then be reset (closed) because the release coil 22 has "normal" current flowing. Each component has returned to the condition which it had before operation, hence it is "self-resetting".

Thus, in the example given, the circuit breaker cannot be reclosed for three minutes after it is tripped by an overcurrent caused by a fault in the power conductors. This predetermined disabled period can be changed by varying the cycle of the timer 42.

In the embodiment disclosed, only the currents in conductors L1 and L3 are monitored. It is not necessary for the current in the third power conductor to be monitored. However, for maximum safety and dependability, and some beneficial redundancy, a third current transformer (not shown) corresponding to 28 or 30 may be used with conductor L2 and connected to an additional rectifier (not shown) corresponding to 38 or 40 in the rectifying circuit 36.

The apparatus is more sensitive to faults which occur between the particular conductors L1 and L3 being monitored, inasmuch as both conductors supply DC current to the holding coil 44. It is important that at least two phases be monitored because if only one phase of a three phase circuit were monitored and a line-to-line fault occurred on the two faces not monitored, the current on the monitored phase would fall to zero, and the other two phases would have abnormally high fault current not sensed.

The invention may be made to respond to higher or lower fault levels by choosing appropriate ratios for the current transformers 28 and 30. As stated, in the example shown, that ratio is 1500/5. In the specific example disclosed, where the current necessary to trigger the holding coil 44 is approximately 10 amperes, this means that the timer 42 and holding coil 44 would be activated by a current of approximately 1500 amperes in each of conductors L1 and L3, or by approximately 3000 amperes in either. Thus, a line-to-line fault between L1 and L3 would have to be approximately 1500 amperes for the apparatus to respond, because both current transformers 28 and 30 would sense the fault current.

The minimum sensitivity of the apparatus. i.e., the maximum fault current required for pick up, can be determined by assuming that a line-to-line fault is occurring in only one of the monitored lines L1 or L3. Here that is the approximately 1500 amperes given in the example above.

By substituting current transformers of 800/5 ratio for the 1500/5 examples illustrated, the minimum sensitivity would be increased because the current in either L1 or L3 required to actuate the safety apparatus would be approximately 1600 amperes instead of approximately 3000 amperes.

The sensitivity of the apparatus, i.e., the current required to be supplied from the current transformers 28 and 30, may be varied by altering one or more of the following:

1. Using a resistance greater than 1 ohm for each of resistors 32 and 34 would increase sensitivity; conversely, decreasing the resistance would reduce sensitivity. For example, 2 ohm resistors would provide 2 milliamperes to the DC relay coil 44 and 10 volts across the timer 42 when only approximately 5 amperes is supplied by either current transformer 28 or 30. Alternatively, instead of using rectifiers 32 and 34 with fixed resistances, potentiometers may be substituted to enable the sensitivity range to be adjusted to coordinate the apparatus' sensitivity with that of the circuit breaker.
2. Using a holding coil 44 which is more sensitive, i.e., requiring lower pickup, would increase sensitivity and using a less sensitive holding coil would decrease sensitivity.

Care should be taken in increasing the apparatus' sensitivity as described above, to avoid nuisance responses, since only currents of abnormal magnitudes will create ionized gas and arcing problems.

The DC holding coil 44 must be sensitive enough to hold the contacts 54 open by current in the milliamperes range, since that same current flows through the release coil 22 and must be kept below a magnitude large enough to cause it to hold the power contacts closed.

The pickup voltage of the timer 42 must be approximately equal to the voltage which is seen across the DC holding coil 44 when it draws its pickup current. Maximum leakage currents through 42 and 44 must not exceed a few milliamperes.

The DC current output from the rectifiers 38, 40 and 50 into the rectifying circuit 36 must be complementary, so they are additive and do not cancel each other out.

The embodiment described and shown to illustrate the present invention has been necessarily specific for purposes of illustration. Alteration, extensions and modifications, and variations in sizes of the components as suggested above, would be apparent to those skilled in the art. The aim of the appended claims, therefore, is to cover all variations included within the spirit and scope of the invention.

The embodiments of the invention in which an exclusive property or privilege is claimed are defined as follows:

1. In an electrical system having a plurality of phase conductors extending between a multiphase electrical power source and a point of use, a circuit breaker having contact means which is movable to and from a closed position connecting said phase conductors to said point of use, undervoltage release coil means effective when energized to hold said contact means closed, means for energizing said undervoltage release coil means to hold said contact means in closed position, means responsive to a predetermined overcurrent condition indicative of a fault in said phase conductors for tripping said contact means by reducing the current in said undervoltage release coil means below a level needed to hold said contact means closed, circuit breaker protection apparatus comprising:

additional means responsive to said predetermined overcurrent condition to prevent re-energization of said undervoltage release coil means for a predetermined time period to enable dissipation of gases ionized during tripping of said contact means, said additional means includes means for generating a direct current signal in response to said overcurrent condition;

direct current relay means responsive to said direct current signal to prevent re-energization of said undervoltage release coil means for said predetermined time period; and timing means for determining said predetermined time period, means for initiating a timing cycle in said timing means concurrently with energization of said direct current relay means and for interrupting normal current flow to said undervoltage release coil means during said predetermined time period and means for restoring normal current flow to said undervoltage release coil means at the end of said predetermined time period.

2. In an electrical system, the improvement of claim 1 in which the means for energizing said undervoltage release coil means is effective to energize said direct current relay means for said predetermined time period.

3. In an electrical system, the improvement of claim 1 including means for automatically re-energizing said undervoltage release coil means to enable reset of the circuit breaker at the end of said predetermined time period.

4. In an electrical system, the improvement of claim 1 including an indicator lamp and means responsive to said overcurrent condition to illuminate the indicator lamp during said predetermined time period.

5. In a multi-phase electrical power system having multiple power conductors connecting a power source to a point of use, a circuit breaker having power contacts in the power conductors, and release coil means effective when energized to hold said power contacts closed and effective when deenergized to trip the circuit breaker and open the power contacts, circuit breaker protection apparatus comprising:

current monitoring means for sensing current in said power conductors and generating an alternating current output proportional to current in said power conductors;

rectifying means for rectifying said alternating current output and converting it to a first direct current output;

holding relay means comprising a holding coil and holding contacts actuatable by said holding coil in response to a predetermined level of said first direct current output which corresponds to an overcurrent equivalent to a fault in said power conductors;

means for deenergizing said release coil means in response to actuation of said holding contacts by said holding coil;

time delay means responsive to rise of voltage of said direct current output to a predetermined level for holding said release coil means deenergized for a predetermined time period to thereby enable dissipation of gases ionized during tripping of the circuit breaker;

a second source of direct current output; and means for energizing said holding coil and said time delay means by said second source of direct current output in response to actuation of said holding contacts to thereby hold said holding coil and time delay means energized independently of said rectifier means during said predetermined time period.

6. In a multi-phase electrical power system, circuit breaker protection apparatus according to claim 5 in which said current monitoring means comprises current transformers associated with at least two of said power conductors.

7. In a multi-phase electrical power system, circuit breaker protection apparatus according to claim 6 in which said current transformers generate output currents which are substantially reduced relative to the currents in the respective power conductors.

8. In a multi-phase electrical power system, circuit breaker protection apparatus according to claim 5 in which said holding contacts are normally closed and in series with said release coil means enabling said release coil means to be energized through said holding contacts, and said holding contacts are opened in response to actuation by said holding coil.

9. In a multi-phase electrical power system, circuit breaker protection apparatus according to claim 12 in which:

said second source of direct current output comprises an other rectifying means having input terminals in shunt with said holding contacts and having output terminals in shunt with said holding coil and with said time delay means.

10. In a multi-phase electrical power system, circuit breaker protection apparatus accordingly to claim 9 in which input terminals of said other rectifying means are connected to said power conductors through a transformer coupling.

11. In a multi-phase electrical power system, circuit breaker protection apparatus according to claim 10 in which said transformer coupling comprises a primary coil connected to at least two of the power conductors and a secondary coil connected in shunt with said holding contacts and in shunt with the input of said other rectifying means.

12. In a multi-phase electrical power system, circuit breaker protection apparatus according to claim 11 in which said release coil means is connected in series with the secondary coil.

13. In a multi-phase electrical power system, circuit breaker protection apparatus according to claim 11 in which said holding contacts are normally closed and are opened in response to actuation by said holding coil, an indicator lamp is connected in shunt with said holding contacts; said release coil means, said secondary coil and said other rectifying means being connected in series with resistance means sized to restrict current through the release coil means to a value insufficient to hold the power contacts closed but sufficient to illuminate said indicator lamp when the holding contacts are open, whereby illumination of the indicator lamp provides a visual warning against re-closing the circuit breaker.

14. In a multi-phase electrical power system having multiple power conductors connecting a power source to a point of use, a circuit breaker having power contacts in the power conductors, and release coil means effective when energized to hold said power contacts closed and effective when deenergized to trip the circuit breaker and open the power contacts, circuit breaker protection apparatus comprising:

current monitoring means for sensing electrical current in at least two of the power conductors and generating a reduced alternating current output proportional to current in said power conductors;

an auxiliary rectifying circuit including a first pair of conductors;

first rectifying means connected between said current monitoring means and said auxiliary rectifying circuit and effective to convert said alternating current output to a first direct current output into said first pair of conductors;

a holding circuit including said release coil means and a second pair of conductors connected to an alternating current power source derived from said power conductors;

holding relay means including a direct current holding coil connected across said first pair of conductors, and normally closed holding contacts connected across said second pair of conductors;

said holding coil being responsive to a predetermined voltage or current condition in said auxiliary rectifying circuit to open said holding contacts to deenergize said release coil means and thereby trip said power contacts;

time switch means in shunt with said holding coil, responsive to a predetermined voltage or current condition in said auxiliary rectifying circuit to hold said holding coil energized and the holding contacts open for a predetermined time period; and second rectifying means in said holding circuit having input terminals in shunt with said holding contacts and having output terminals connected in shunt with said holding coil;

whereby said second rectifying means is normally deactivated by the holding contacts when closed but is activated by said alternating current power source when the holding contacts are opened to thereby provide a secondary power source to maintain said holding coil energized during said predetermined time period; and whereby further said holding relay means prevents reclosing of said power contacts for said predetermined time period following tripping of the circuit breaker to enable safe dissipation of gases ionized during tripping.

15. In a three-phase electrical power system having three power conductors connecting a three-phase electrical power source to a point of use, a circuit breaker having power contacts in the power conductors, and undervoltage release coil means effective when energized to hold said power contacts closed and effective when deenergized to trip the circuit breaker causing said power contacts to open and thereby disconnect the power source from the point of use, circuit breaker protection apparatus comprising:

means for monitoring electrical current in at least two of the power conductors comprising first and second current transformers associated respectively with said at least two power conductors and effective to generate alternating electrical currents proportional to the currents in the respective power conductors;

first and second rectifiers connected respectively to the outputs of said first and second current transformers having direct current outputs proportional to the currents in the respective power conductors;

a holding circuit having said undervoltage release coil means and a third rectifier in series with an electrical power source derived from t least two of said power conductors;

a holding relay comprising, a direct current holding coil and normally closed holding contacts, said holding coil being connected to the outputs of the first, second and third rectifiers, and the holding contacts being connected in shunt with the input to said third rectifier;

said holding coil requiring a predetermined current level to open said holding contacts; and a timer switch having normally open timer contacts connected in shunt with said holding coil, said timer switch being responsive to a predetermined voltage output from said rectifiers to keep said timer contacts open for a predetermined time period while the output currents from one or more of the rectifiers actuates the holding coil to keep the holding contacts open;

whereby said holding relay prevents reclosing said power contacts for said predetermined time period following tripping of the circuit breaker to enable safe dissipation of gases ionized during a previous tripping operation of the circuit breaker.

16. In a multi-phase electrical power system, circuit breaker protection apparatus according to claim 14 in which resistor means is connected between the holding coil and the second rectifying means to limit current flow therebetween.

* * * * *